(12) United States Patent
Øvsthus et al.

(10) Patent No.: US 11,589,564 B2
(45) Date of Patent: Feb. 28, 2023

(54) PUMP DEVICE

(71) Applicant: Mjøs Metallvarefabrikk AS, Lonevåg (NO)

(72) Inventors: Aksel Øvsthus, Lonevåg (NO); Eimund Øvsthus, Lonevåg (NO)

(73) Assignee: MJØS METALLVAREFABRIKK AS, Lonevåg (NO)

( * ) Notice: Subject to any disclaimer, the term of this patent is extended or adjusted under 35 U.S.C. 154(b) by 121 days.

(21) Appl. No.: 17/255,785

(22) PCT Filed: Jun. 26, 2019

(86) PCT No.: PCT/EP2019/066978
§ 371 (c)(1),
(2) Date: Dec. 23, 2020

(87) PCT Pub. No.: WO2020/002418
PCT Pub. Date: Jan. 2, 2020

(65) Prior Publication Data
US 2021/0120792 A1   Apr. 29, 2021

(30) Foreign Application Priority Data

Jun. 28, 2018 (NO) .................................... 20180915
Nov. 19, 2018 (NO) .................................... 20181477

(51) Int. Cl.
*F04D 29/42* (2006.01)
*A01K 79/00* (2006.01)
(Continued)

(52) U.S. Cl.
CPC ............ *A01K 79/00* (2013.01); *F04D 29/426* (2013.01); *F04D 29/225* (2013.01); *F04D 29/669* (2013.01)

(58) Field of Classification Search
CPC ..... A01K 79/00; F04D 29/406; F04D 29/426; F04D 29/669; F04D 29/225
See application file for complete search history.

(56) References Cited

U.S. PATENT DOCUMENTS 1,470,607 A   10/1923   Hazell
2,456,128 A   12/1948   Kessler
(Continued)

FOREIGN PATENT DOCUMENTS

DK   97 00417 U3   12/1997
EP   0 152 383      8/1985
(Continued)

OTHER PUBLICATIONS

International Search Report dated Oct. 2, 2019 in International (PCT) Application No. PCT/EP2019/066978.
(Continued)

*Primary Examiner* — Justin D Seabe
(74) *Attorney, Agent, or Firm* — Wenderoth, Lind & Ponack, L.L.P.

(57) ABSTRACT

A pump device is for sucking and transferring objects. The pump device includes a pump housing, at least one impeller, an air withdrawal opening, at least one inlet opening defined in the pump housing, at least one outlet opening defined in the pump housing, and at least one chive device connected to the pump device. The pump housing includes a first short side defined as a semicircle or a partial circle and a second short side defined as a flat or plane surface, two long sides having a tapered shape extending from the first short side to the second short side, and two planar sides so as to define a closed pump housing. The at least one impeller is in the pump housing.

10 Claims, 8 Drawing Sheets

(51) Int. Cl.
*F04D 29/22* (2006.01)
*F04D 29/66* (2006.01)

(56) References Cited

U.S. PATENT DOCUMENTS

| | | | |
|---|---|---|---|
| 2,655,868 A | | 10/1953 | Lindau et al. |
| 2,997,345 A | * | 8/1961 | Stahle .................. B65G 53/30 406/137 |
| 3,180,269 A | | 4/1965 | Wells |
| 3,809,491 A | * | 5/1974 | Banyai ...................... F04D 1/14 415/73 |
| 4,193,737 A | * | 3/1980 | Lemmon .................. F04D 7/02 415/206 |
| 4,427,336 A | * | 1/1984 | Lake .................. F04D 29/2216 416/176 |
| 4,575,312 A | | 3/1986 | Erikson |
| 4,792,282 A | * | 12/1988 | Jordan .................... B63H 11/11 440/47 |
| 5,967,744 A | * | 10/1999 | Danner ............... F04D 15/0016 415/206 |
| 6,210,109 B1 | | 4/2001 | Will et al. |
| 2018/0045222 A1 | | 2/2018 | Rodrigues |

FOREIGN PATENT DOCUMENTS

| | | | |
|---|---|---|---|
| JP | 55-83296 | 6/1980 | |
| JP | 56-162236 | 12/1981 | |
| JP | 57-53423 | 3/1982 | |
| JP | 57-57123 | 4/1982 | |
| JP | 62-83925 | 4/1987 | |
| KR | 200399161 Y1 * | 10/2005 | ............. F04D 13/02 |
| WO | 89/07715 | 8/1989 | |
| WO | 2018/160053 | 9/2018 | |

OTHER PUBLICATIONS

Search Report dated Jun. 5, 2019 in Norwegian Application No. 20181477.

* cited by examiner

Chamber that decelerate velocity before outlet

Chamber that decelerate velocity before outlet

SECTION A-A

PUMP DEVICE

BACKGROUND OF THE INVENTION

1. Field of the Invention

The present invention relates generally to a pump device for pumping and transporting fragile or delicate items.

More particularly, the present invention relates to a pump device comprising at least one impeller, where the pump device, for instance, may be a pump for use in connection with the transport of fruit and/or vegetables, such as apples and/or potatoes, or a fish pump for use in connection with loading, unloading and treating of fish.

2. Description of Related Art

In the fishing industry, including the aquaculture industry and the food industry as a whole, moving or transporting a large number of products from one source to a market without damaging the products is a primary goal. The transportation of fish represents a particular problem because of their strong but still fragile structure. The transport of fish, whether from trawlers, fishing nets or storage areas, is most desirable if the fish is not damaged during transfer.

In commercial fishing, for example, the use of fish nets or fish trawls to draw the fish towards a fishing vessel may cause damage or death to the fish. If the fish is transferred directly from the fishing net or fish trawl to one or more storage tanks on board the fishing vessel using a fishing pump, the fish may be transferred without damage, whereby this does not hinder or delay the processing time. Present known fish pumps have limited capacity, and transport or transfer of larger fish may cause serious damage to the fish. Although current fishing pumps are used within a given capacity range, the pump design may unfortunately cause the fish to be subjected to unnecessarily large strains due to impact or impact on the wall where pressurized water meets water with compressed fish.

During pumping, fish are subjected to forces that may cause damage that degrades the quality so that the fish is no longer suitable for the production it was intended for. A number of factors may affect the quality, such as the size of the fish, the design of the pipes and the transport route through which the fish is going, transport route and the pumping method.

Transfer of haul from a fishing vessel to a slaughter place, treatment port or similar and harvesting of the contents in a growing tank at a fish farm requires the handling of large quantities of water containing live fish or other living organisms. While fishing and aquaculture are specific examples, there are other industries that transport products by using liquid as a means of transport.

The problems associated with pumping of fish may mainly be divided into three categories: 1) crowding of fish before the pumping in order to increase the efficiency of the pumping; 2) the design of the fishing pump itself with the danger of injury and wounding of the fish, and 3) pump pipe or hose with stress challenges caused by speed, pump length, loss of control for the fish and pump stoppage.

Here the pumping may lead to wounds and fin damage to the fish, hematoma and in some cases bleeding gills and wounds. The stress level and the injuries caused by the pumping may further lead to reduced welfare and reduced product quality (for example, splitting, red-colored fillet, shortened pre-rigor time). Physical damage to the fish may be related to the design of the equipment (bend, welds, valves and pressure tank), but also physics such as pressure reduction over time has been linked directly to bleeding gills.

The most common fishing pumps used today are centrifugal pumps and pumps based on vacuum.

A centrifugal pump uses a rotating impeller arranged in a pump housing to increase the pressure in a liquid. The impeller is designed with rounded blades to avoid damage to fish. When the impeller starts to rotate, the water is ejected to the side and directed through the pump housing into which the impeller is mounted, to the outlet of the pump. In the center of the impeller, a suction will then be formed where new water flow in. Fish and water are led into the center of the pump and thrown out to the side via the impeller. Then, fish are collected in a channel for collection and are transported further by means of the pressure built up.

A "vacuum pump" uses vacuum or pressure to transport fish, where the pump consists of a tank and a pipe connected to each side of the tank. The tank alternates between underpressure (vacuum) and overpressure, in order to alternately suck fish from, for instance, a net cage and then push it further from the tank and over to, for example, a well boat.

NO 147829 relates to a device for sucking up and transferring of fish, where the device comprises a hermetically sealed tank for sucking up of a fish/water mixture, an air outlet opening and an air supply opening in the upper part of the tank, an intake opening and an outlet opening arranged in the lower part of the tank and connected to a fish/water suction pipe and a fish/water discharge pipe, an air extraction device and an air supply device respectively connected to the air extraction opening and the air supply opening and a control device for alternately switching the air extraction device and the air supply device and for starting and stopping them devices EP 2.295.808 A2 relates to a pump or device comprising a tubular housing having an inlet opening and an outlet opening, and a helical rotor with a hub carrying at least one blade. The rotor is in line with a stator which is connected to an inner wall of the tubular housing by means of guiding blades. The guiding blades comprise a slanting end directed to the inlet opening and making an entrance angle Y with the rotational axis X, and a second end directed to the outlet opening which is parallel to the rotational axis. The slanting end of the guiding blades slants under an angle with the rotational axis which is smaller than 45°.

NO 130700 B relates to a centrifugal pump having a vane-shaped impeller having an axial inlet opening and being stored in a housing, and wherein the inlet edges of the vanes are located in front of a plane perpendicular to the impeller shaft, which passes through the end of the inlet edges adjacent the impeller hub.

JP S56162236 US relates to a pumping device for transferring solid objects, where the pumping device comprises an outer pump housing and an internal pump housing arranged in a lower part of the pump housing. An impeller provided with a plurality of blades is provided in the inner pump housing, the impeller being further connected to a shaft which is driven by an engine. The outer pump housing is provided with an inlet for sucking water at the center of the inner pump housing, and the inner pump housing is further provided with an outlet opening for conveying water to the upper part of the outer pump housing.

There is thus a need for alternative solutions to today's pump devices, for instance fish pumps, for use during loading and unloading of fish, or at least supplementary devices.

SUMMARY OF THE INVENTION

The object of the present invention is to provide a pump device comprising at least one impeller and which is used for pumping and transporting fragile or delicate objects, for example during loading and unloading of fish, where loading and unloading of fish takes place through a continuous pumping process and without stay in the tank, where the impeller and pump device better safeguard fish welfare, reduce stress on the fish and reduce mortality and which may also improve the quality of the fish.

These objects are achieved according to the present invention with a pump device comprising at least one impeller used for pumping and transporting fragile or delicate items.

The present invention relates to a pump device which is used for pumping and transporting fragile or delicate items, where the pump device according to one embodiment may be a fish pump for sucking and transferring fish from a first place to a second place, where the fish pump may, for instance, be used for loading and unloading of live fish from a first site that holds the fish and to a second site, where the first site may be a fish farm which includes a number of net cages, while the other site may be the same or another fish farm, a vessel, a slaughter place or the like.

The pump device according to the present invention may, in an alternative embodiment, be a pump used to pump up and transport fruit and/or vegetables from a first place to a second place.

The fish pump for suction and transfer of fish may in one embodiment comprise a pump housing, and in the pump housing is formed an air withdrawal opening, at least one inlet opening and at least one outlet opening, where the fish pump is connected to at least one drive device, where the pump housing may comprise a first short side formed as a half or partial circle and a second short side formed as a flat surface, two long sides extending tapered from the first short side to the second short side and two planar sides, forming a closed pump housing, and at least one impeller further being arranged in the pump housing.

Flat surfaces are to be understood as those sides which form a top and bottom of the pump housing when the fish pump is arranged horizontally, or a front and rear side of the pump housing when the fish pump is arranged vertically.

The at least one drive device may be, for example, an electric motor, a hydraulic motor or the like. One skilled in the art will know that other drive devices can also be used.

In an alternative embodiment, the fish pump for suction and transfer of fish may comprise a pump housing, and an air withdrawal opening formed in the pump housing, two inlet openings and an outlet opening, wherein the fish pump may further be connected to a drive device, where the fish pump further comprises two impellers arranged in the same plane and at a distance from each other, where a first impeller is formed with a flow channel to provide a rotation of the first impeller in one direction and a second impeller is formed with a flow channel to provide a rotation of the second impeller in an opposite direction of the rotation of the first impeller. As indicated, the pump housing may comprise a first short side formed as a semicircle or partial circle and a second short side formed as a flat surface, two long sides extending tapering from the first short side to the second short side and two planar sides, forming a closed pump housing.

The at least one drive device may be, for example, an electric motor, a hydraulic motor or the like. One skilled in the art will know that the pumping device may be driven by other drive means.

In a further alternative embodiment, the fish pump for suction and transfer of fish may comprise a pump housing and an air withdrawal opening formed in the pump housing, two inlet openings and an outlet opening, where the fish pump may further be connected to a drive device, the fish pump further comprising an impeller and a nozzle arranged in the pump housing in the same plane and at a distance from each other, the impeller being formed with a flow channel to provide a rotation of the impeller in one direction, while the nozzle is formed with a number of flow channels to provide a rotation of the nozzle in an opposite direction of rotation of the impeller. The number of flow channels formed in the nozzle will then provide a current setting of a rotation of the liquid, similar to that of an impeller. As indicated, the pump housing may comprise a first short side formed as a semicircle or a partial circle and a second short side formed as a flat surface, two long sides extending tapered from the first short side to the second short side and two planar sides, forming a closed pump housing.

The nozzle may, in a similar manner to the impeller, be formed with an inlet opening for the number of flow channels.

In one embodiment, the nozzle may comprise a main body, to which main part, on opposite sides thereof, an inlet spigot and a shaft pin are connected to or integrated with. The inlet passage of the flow channels may then be arranged to extend through the inlet spigot.

In this alternative embodiment, the nozzle may be connected to an external liquid pump which only pumps water and not fish, so that fish will only be supplied to the fish pump through the impeller.

When viewed in a longitudinal cross section of the fish pump, the pump housing may have a rectangular shape, each of the short sides of the pump housing and plane sides being arranged parallel to each other. In an alternative embodiment, when viewed in a longitudinal cross-section of the fish pump, it may be envisaged that the pump housing has a tapered shape from the first short side to the second short side, where the plane sides of this embodiment then will be arranged to form an angle with respect to each other.

Furthermore, a removable cover can, in all the above-mentioned embodiments, be connected to the pump housing by means of suitable means in the form of bolt and nut, screws or the like, so as to provide a "closed" pump housing. The removable cover may be made of a suitable metal but may also be of glass so as to provide an "inspection hatch" in the fish pump. The removable cover may be one of the plane sides, or the removable cover may be part of the plane side.

In one embodiment, the first short side of the fish pump may be formed with a width less than half the length of the fish pump.

According to one aspect of the present invention, each inlet port of the fish pump may be formed with a first cross-sectional area and a second cross-sectional area, where the first cross-sectional area is larger than the second cross-sectional area and where a transition between the first cross-sectional area and the second cross-sectional area may form an internal abutment shoulder in the inlet port of an inlet spigot formed on the impeller when each impeller is arranged in the pump housing. The inlet end of the impeller and/or the nozzle may then be designed to have a shape which is complementary to the first cross-sectional area of the inlet opening.

The inlet or inlet openings of the fish pump may be formed in a surface which forms the bottom of the pump housing or one side, while the outlet may be formed in an opposite surface constituting the top or the other side of the pump housing, such that the outlet of the pump housing is arranged substantially parallel to the one or more inlet of the pump housing. In an alternative embodiment, the inlet opening or inlet openings may be formed in a surface constituting the bottom of the pump housing or one flat side, while the outlet may be formed in the first or second short side, such that an axis extending through the outlet will be arranged substantially perpendicularly to one axis extending through the inlet.

In order to be able to connect a pipe or a hose to an inlet opening, each inlet opening may be formed with a flange or connecting piece which extends a distance out from the pump housing. The pipe or hose may then be threaded onto the flange or the connecting piece and secured thereto by means of suitable fastening devices. Alternatively, the pipe or hose may be formed with a flange or connecting piece which may be inserted into the inlet opening and then secured to it in suitable ways. The inlet opening may then be formed with a recess for the flange or the sleeve.

In order to avoid fish being damaged when the fish is pumped out of the pump housing, the outlet opening in the pump housing may, on an end or surface facing into the pump housing, be formed with a rounded edge. Such a rounding will also mean that the water being pumped will be able to pass out through the outlet opening without creating "disturbances" in the water flow in the pump housing. The outlet opening, similar to the inlet openings, will be designed to be connected to a pipe or hose.

In an alternative embodiment, the pump housing may, in an area around the outlet, be designed to have a substantially conical shape, where the outlet then is arranged at the end of the conical area. The outlet may furthermore be designed to extend over a longer or shorter length of one long side or short side of the pump housing.

Further, a surface of the pump housing or the removable cover forming the top or the other side of the pump housing may be formed with two through openings, the two through openings being provided on an opposite side or surface of the inlet openings and arranged coaxially therewith. In such an embodiment, each impeller may also comprise a shaft pin which is designed to be arranged in the through opening of the pump housing or the removable cover.

Each impeller used in the pumping device may comprise a main part, an inlet spigot and a shaft pin being arranged on opposite sides of the main part. The impeller is further formed with a flow channel extending through the inlet spigot and the main part, whereby the inlet spigot forms the inlet of the flow channel and the main part forms the outlet of the flow channel. Further, an axis extending through the outlet of the flow channel is arranged to be substantially perpendicular to an axis extending through the inlet of the flow channel.

The impeller flow channel may have a length which extends less than one half of the circumference of the impeller, more preferably the flow channel may have a length which extends less than one third of the circumference of the impeller, even more preferably, the flow channel may have a length which extends less than one quarter of the circumference of the impeller. However, one skilled in the art will appreciate that the impeller may be formed with a flow channel having a different length than indicated above According to one aspect of the present invention, the impeller may be molded in one piece, whereby the inlet spigot of the impeller and the shaft pin of the impeller will be integral with the main part of the impeller, but it may also be envisaged that the impeller may be made of several parts or elements assembled and suitably connected to provide the impeller. For example, the impeller may be made of three parts or elements, these being the main part, the inlet spigot and the shaft pin.

The main part of the impeller may, in one embodiment, have a circular cylindrical shape with a given height and straight or plane end terminations, but one skilled in the art will understand that the main part may also be designed to have other shapes, for example a polygonal shape, where the main part can, for example, be designed as a hexagon or octagon.

In an embodiment where the impeller is formed with a circular cylindrical shape, an outer circumference of the impeller may be formed with a smooth and even outer surface, where the outlet of the flow channel may also be formed with a rounding towards the flow channel. Such a design of the impeller will facilitate a balancing of the impeller, as the impeller is designed to be balanced in both air and water.

The transition between the main body and the inlet spigot may be continuous and gradually tapered.

According to one aspect of the present invention, the flow channel may have a substantially equal cross-section over the entire length of the flow channel, from the flow channel inlet into the inlet spigot to the outlet of the flow channel in the main body.

The impeller may thus be formed with a flow channel which may have a substantially equal cross-section over the entire length of the flow channel, i.e. from an inlet to an outlet and a substantially smooth and even outer surface. Since the design of the impeller may create an imbalance when the impeller is arranged in a pump device and the pump device is in operation, the impeller must be balanced in relation to not only being "able to run" in water, but also in case the pump device runs out. In such a case, the impeller flow channel will be emptied, and the impeller may continue to rotate without causing harmful vibrations in the pump device. A balancing of the impeller must also be performed when the impeller is arranged in water.

In one embodiment, the flow channel may, from an inlet to an outlet, be formed with a helical or curved shape, where the inlet of the flow channel will be along the axis of rotation of the impeller, while the outlet of the flow channel may be formed substantially perpendicular to the axis of rotation of the impeller.

According to one aspect, the main part of the impeller may be formed with one or more weight elements, where the weight element or weight elements is/are, for example, arranged on one or both sides of the impeller outlet and/or flow channel, or even in the vicinity of the impeller outlet and/or flow channel, so to "balance" the impeller when the impeller rotates in the pump device. Alternatively, the main body of the impeller may be formed with one or more internal cavities, where the cavity or cavities is/are connected to one or more channels which form a connection between the cavity or cavities and the environment of the impeller so that liquid is allowed to flow into the cavity or cavities so as to "balance" the impeller when the impeller rotates in the pump device. The cavities or cavities will then function as weight element or weight elements when filled with water.

However, one skilled in the art will appreciate that weight element or weight elements and/or one or more cavities may be located elsewhere in the main part of the impeller than indicated above.

Weight elements may be designed to have the same weight, or the weight elements may be designed to also have different weights.

As stated above, each impeller may be formed with an inlet spigot, where the inlet spigot will also form the inlet of the flow channel, and a shaft pin which is arranged on an opposite side of the inlet spigot. When the impellers are arranged in the pump housing, the inlet spigot of the impeller will be arranged in the inlet opening provided in the bottom of the pump housing/one side and will be in abutment with the abutment shoulder formed in the inlet opening, while the shaft pin will be arranged in the through opening provided on an opposite side of the inlet opening, in the top/other side of the pump housing, so that each impeller is fixed in the pump housing through the inlet opening and the through opening of the pump housing.

The impeller inlet spigot will then have a shape that is complementary to the inlet opening of the pump housing and a diameter smaller than a diameter of the first cross-sectional area. Similarly, the shaft pin of the impeller will have a shape that is complementary to the through opening of the pump housing and a diameter less than a diameter of the through opening.

Between the inlet spigot of the impeller and the inlet opening of the pump housing and the shaft pin of the impeller and the through opening of the pump housing, one or more sealing means may be provided in the form of O-rings, gaskets and/or wear rings or the like, so as to provide a tight connection between these elements.

Furthermore, one or more of the inlet spigots, shaft pins, pump housing's inlet openings and/or through openings may be provided with a friction-inhibiting material to allow rotation of impellers. Alternatively, one or more bearings may be arranged between the impeller inlet spigots and the pump housing's inlet opening and the impeller's shaft pin and the pump housing through opening.

According to one aspect of the present invention, the two inlets of the pump housing may be designed to have a total area which will substantially correspond to the area of the outlet of the pump housing, so that a quantity of water per unit of time supplied to the fish pump through the two inlets, where the supplied water has a given speed, will be substantially the same amount of water per unit of time discharged from the fish pump through the one outlet, where the water discharged from the fish pump further will substantially have the same speed as the water entering the fish pump.

The inlet openings may be designed to have the same area, i.e. half the area of the outlet opening, but it may also be conceivable that the inlet openings may be formed with different areas, for example in an embodiment comprising the use of two impellers or an impeller and a nozzle in which for example, one inlet opening may be formed with a larger (or less) area than the second inlet opening, but where the total area of the two inlet openings will be substantially the same as the area of the outlet opening.

In the embodiment of the fish pump which comprises the use of only one impeller, the area of the inlet opening will be substantially the same as the area of the outlet opening.

In one embodiment, one or more weight elements may be provided in each impeller, where one or more weight elements are arranged at a distance from the flow channel, so as to provide a "balancing" of impeller during rotation. It is also conceivable that the impeller may be formed with one or more internal cavities, where the cavity or cavities are connected to a channel or bore, where the inlet of the channel or bore faces away from the outlet of the flow channel.

BRIEF DESCRIPTION OF THE DRAWINGS

Other advantages and features of the invention will become apparent from the following detailed description, the accompanying drawings, and the appended claims, wherein:

FIGS. 3A-3B show a cross-section of the pump device of FIG. 2 along a section A-A, wherein FIG. 3A shows a pump housing without impellers, and FIG. 3B shows the pump housing and impellers arranged therein, FIGS. 5A-5B show details of the impeller of FIGS. 2A-2B and 3, wherein FIG. 5A shows the impeller from above and FIG. 5B shows a cross-section of the impeller along a section B-B.

DETAILED DESCRIPTION OF THE INVENTION

Figure 1:
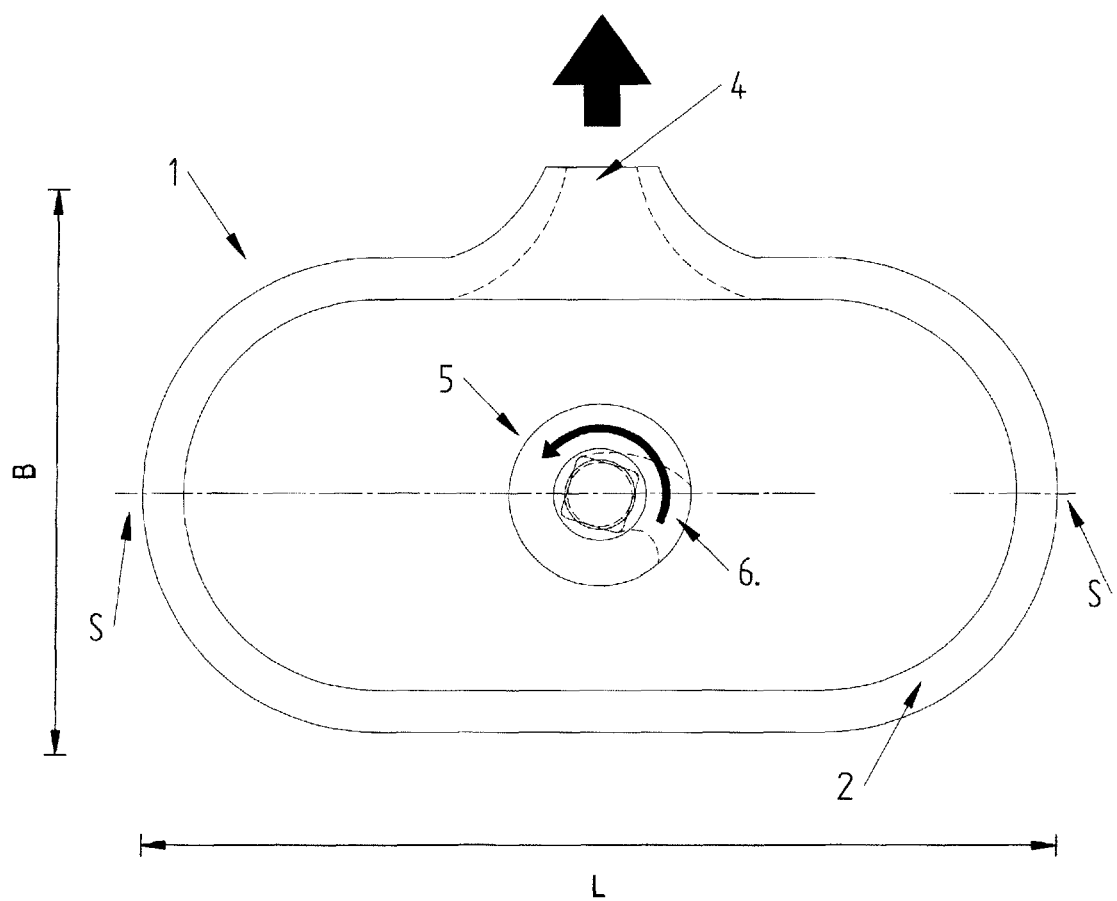
FIG. 1 shows a top view of a first embodiment of a pump device according to the present invention.

FIG. 1 shows a principal sketch, seen from above, of a pump device 1, where the pump device 1 in this case is a fish pump which is used to pump up fish from, for example, a trawl and on board a fishing vessel, from a net cage and to a well boat, or also from a net cage to another net cage in a fish farm.

The pump device 1 may also be used in connection with the transport of fruit or vegetables, such as, for example, apples or potatoes.

The fish pump 1 is designed to have an oval shape, where a pump housing 2 then comprises two parallel long sides and two rounded ends.

In an alternative embodiment at least one of the long sides of the pump housing 2 may be designed to have a curved form, whereby the long sides in such an embodiment do not to be parallel over their entire length.

The fish pump 1 comprises a pump housing 2 and a removable cover (not shown) which are connected, via suitable connecting devices in the form of bolts, screws or the like, to the pump housing 2. The removable cover (not shown) may be of glass to provide an inspection opening in the fish pump. Such a design will also result in a simpler access to the inner volume of the pump housing, so that maintenance and/or repairs of one or more impellers etc. arranged in the pump housing 2 are facilitated.

In one embodiment, the fish pump 1 has a width B which is less than a length L of the fish pump 1 and is further formed with rounded short sides, thus providing an "oval" shape on the fish pump 1. The fish pump 1 is further formed with a flat top and bottom side (front and rear side) when viewed in a longitudinal cross-section of the fish pump 1, where the top and bottom sides are arranged at a distance H from each other.

The pump housing 2 is, on an underside, when viewed in a longitudinal cross-section of the fish pump 1, formed with an inlet opening 3, where the inlet opening 3 is further arranged to be located along a longitudinal center line S and a transverse center line of the fish pump 1.

The inlet opening 3 is further formed with a flange 3A or spigot, where the flange 3A or the spigot extends a distance out from the pump housing 2. The inlet opening 3 is further formed with a first inner cross-sectional area $A^1$ and a second inner cross-sectional area $A^2$, where a transition from the first interior cross-sectional area $A^1$ to the second inner cross-sectional area $A^2$ will form an abutment shoulder 7 for an impeller 5 arranged in the fish pump 1.

Figure 2:
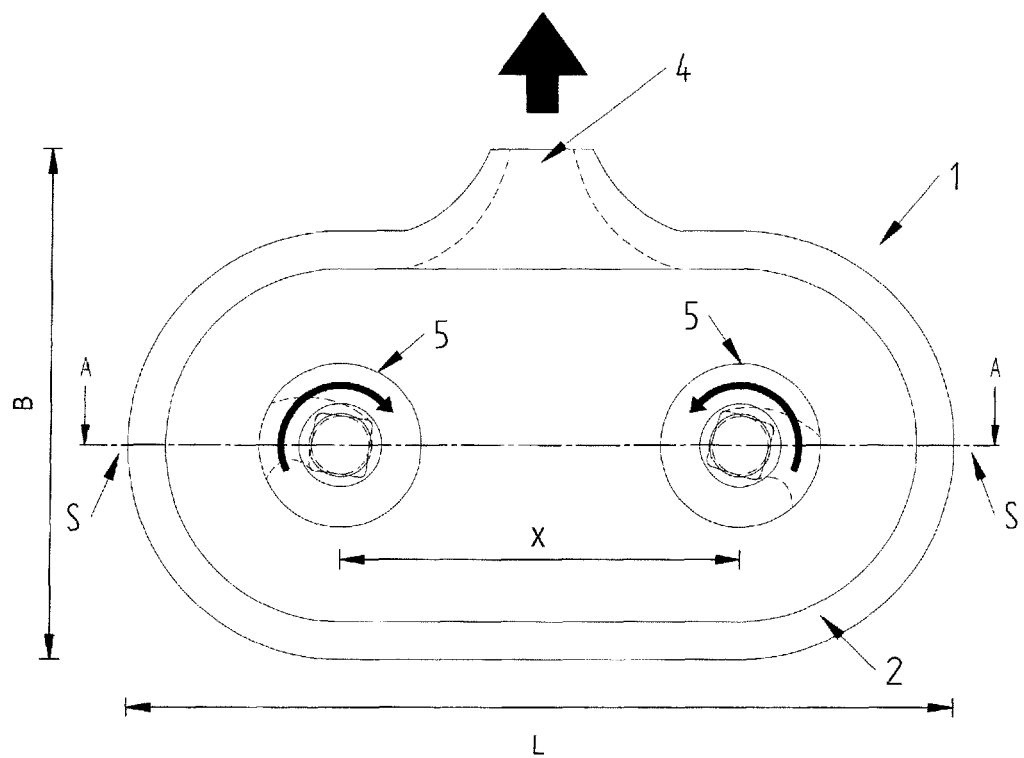
FIG. 2 shows a top view of an alternative embodiment of a pump device according to the present invention.

As indicated by an arrow, the impeller 5 in this embodiment is formed with a flow channel 6 which provides a counterclockwise rotation. It should be understood, however, that the flow channel 6 may be formed with a flow channel which provides a clockwise rotation FIG. 2 shows a principle sketch, seen from above, of an alternative fish pump 1, where the fish pump 1 is used to pump up fish from, for example, a trawl and on board a fishing vessel, from a net cage and to a well boat, or also from a net cage to another net cage in a fish farm.

The fish pump 1 is designed to have an oval shape, where a pump housing 2 then comprises two parallel long sides and two rounded ends.

In an alternative embodiment, at least one of the long sides of the pump housing 2 may be designed to have a curved shape, whereby the long sides in such an embodiment do not have to be parallel over their entire length.

The fishing pump 1 comprises a pump housing 2 and a removable cover (not shown) which are connected, via suitable connecting devices in the form of bolts, screws or the like, to the pump housing 2. The removable cover (not shown) may be of glass to provide an inspection opening in the fish pump. Such a design will also result in an easier access to the inner volume of the pump housing, so that maintenance and/or repairs of impellers etc. are facilitated.

In one embodiment, the fish pump 1 has a width B which is less than a length L of the fish pump and is further formed with rounded short sides, thus providing an "oval" shape on the fish pump 1. The fish pump 1 is further formed with a flat top and bottom side (front and rear side) when viewed in a longitudinal cross-section of the fish pump 1, where the upper and lower sides are arranged at a distance H from each other.

The pump housing 2, when viewed in a longitudinal cross-section of the fish pump 1, is formed with two spaced apart inlet openings 3, the inlet openings 3 being further arranged along a longitudinal center line S of the fish pump 1.

Each inlet aperture 3 is further formed with a flange 3A or spigot, the flange 3A or spigot extending a distance out from the pump housing 2. Each inlet opening 3 is further formed with a first inner cross-sectional area $A^1$ and a second inner cross-sectional area $A^2$, where a transition from it the first inner cross-sectional area $A^1$ to the second inner cross-sectional area $A^2$ will form an abutment shoulder 7 for an impeller 5 arranged in the fish pump 1

The direction of rotation of each impeller 5 is indicated by an arrow, whereby a first impeller 5 is designed to rotate clockwise, while a second impeller 5 is designed to rotate counterclockwise.

Figure 3B:
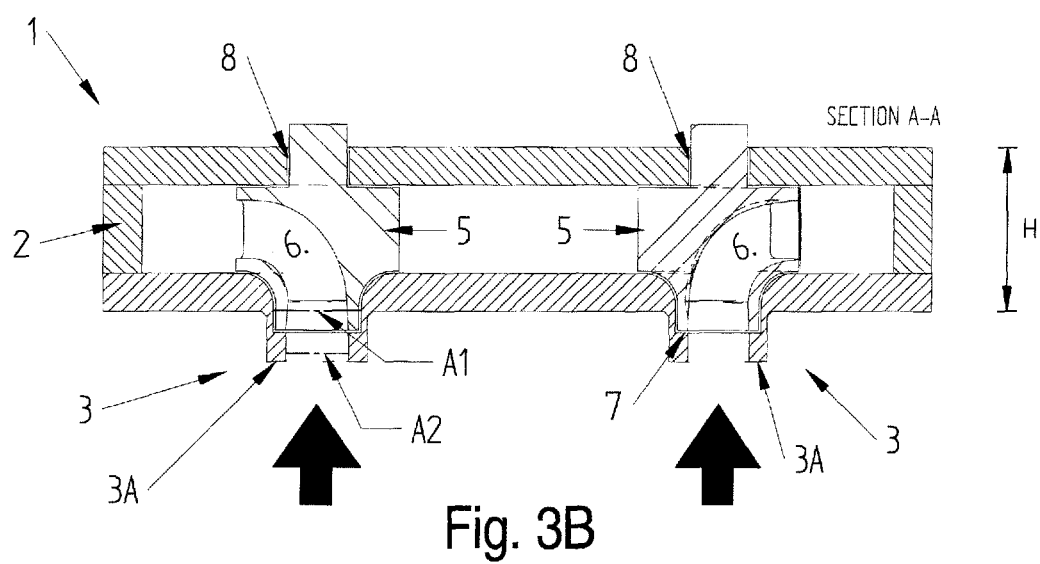
Figure 3A:
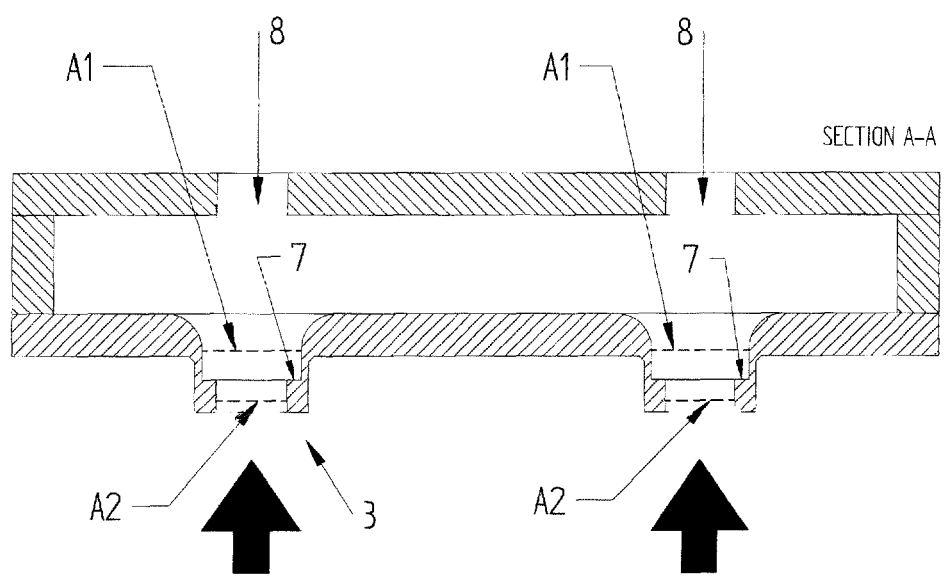

FIGS. 3A-3B are a longitudinal cross-section through line A-A of FIG. 2, where FIG. 3A shows the pump housing 2 without impellers 5, while FIG. 3B shows two impellers 5 arranged in the pump housing 2.

The inlet openings 3 and the outlet opening 4 are, at one end facing into the pump housing 2, formed with an inner rounded edge.

On one side opposite the underside, when viewed in a longitudinal cross section of the fish pump 1, the pump housing 2 is formed with two through openings 8.

Figure 4:
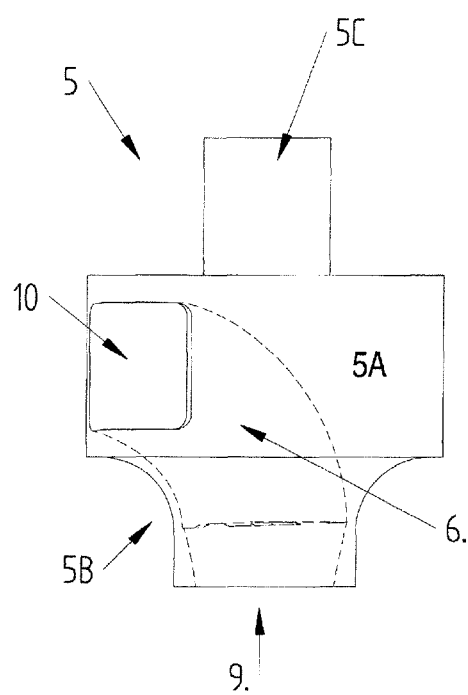
FIG. 4 shows a side view and a perspective view of an embodiment of an impeller used with the pump device of the present invention.
Figure 4:
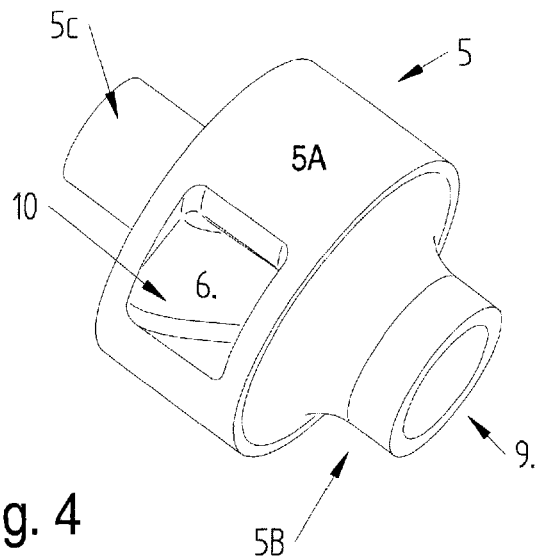

FIG. 4 shows a side view of an impeller 5 used in the fish pump 1 according to the present invention, seen in a perspective view, showing that the impeller 5 comprises a main part 5A, an inlet spigot 5B and a shaft pin 5C, the inlet spigot 5B and the shaft pin 5C being arranged on opposite sides of the main part 5A. Furthermore, the main part 5A of each impeller 5 is formed with a flow channel 6 extending through the inlet spigot 5B and the main part 5A, the inlet spigot 5B forming the inlet 9 of the flow channel 6. The outlet 10 of the flow channel 6 will be arranged substantially perpendicular to the inlet 9 of the flow channel 6.

The inlet spigot 5B is formed with a shape complementary to the inlet opening 3 of the pump housing 2 and an outer diameter of the inlet spigot 5B is somewhat smaller than the first inner cross-sectional area $A^1$ of the inlet opening 3.

Correspondingly, the shaft pin 5C will be formed with a shape that is complementary to the through openings 8 of the pump housing 2 and an outer diameter which is somewhat smaller than an inner cross-section of the through opening.

Figure 5A:
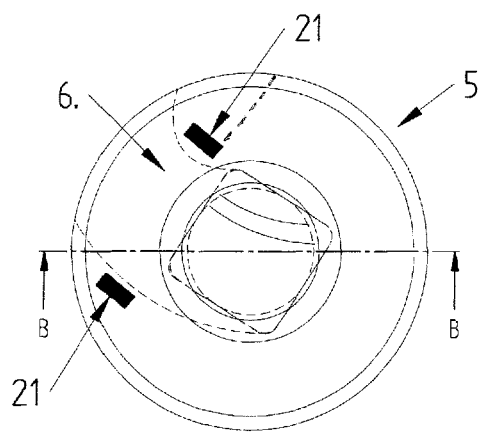
Figure 5B:
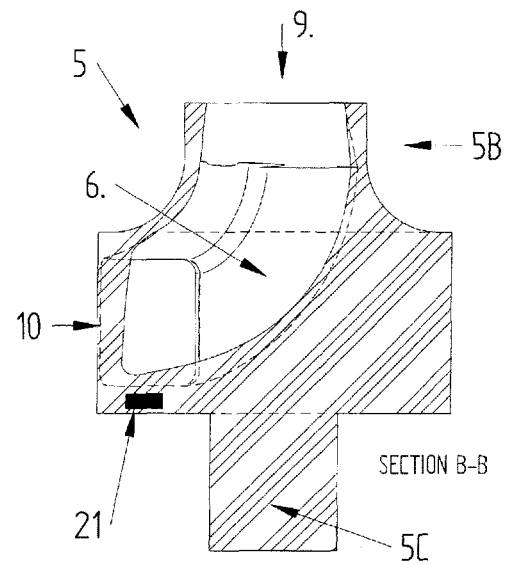

FIGS. 5A-5B show further details of the impeller 5.

The flow channel 6 is designed to have substantially the same cross-sectional area throughout the length of the flow channel 6, from the inlet 9 of the flow channel 6 to the outlet 10 of the flow channel 6, where the flow channel 6 further is helically or spirally shaped. Such a design of the flow channel 6 of the impeller 5 will cause the fish to be much less exposed to impact and/or damage when the fish is guided through the impeller 5, since the flow channel 6 is not designed with "edges" to which the fish can be struck against. Fish will also, to a lesser extent, come into contact with other fish over the length of the flow channel 6, since the substantially the same cross-sectional area will to a lesser extent result in a contraction of fish.

Since the impellers 5 are only formed with one flow channel 6, this may cause the impellers 5 to be subjected to "throwing" during rotation, whereby at least one weight element 21 is arranged in the main part 5A of the impeller 5, so as to provide a balancing of impeller 5 during rotation. The at least one weight element 21 is arranged at a distance from the flow channel 6.

Such a weight element 21 may also be constituted by an internal cavity formed in the main part 5A of the impeller 5, where the cavity is connected to a bore (indicated by dotted lines) or channel to provide a connection between the cavity and the surroundings of the impeller, so that the cavity can be filled up when the impeller is submerged. Water from the pump housing will then flow through the bore or channel and into one or more internal cavities, so as to fill up these.

Figure 6:
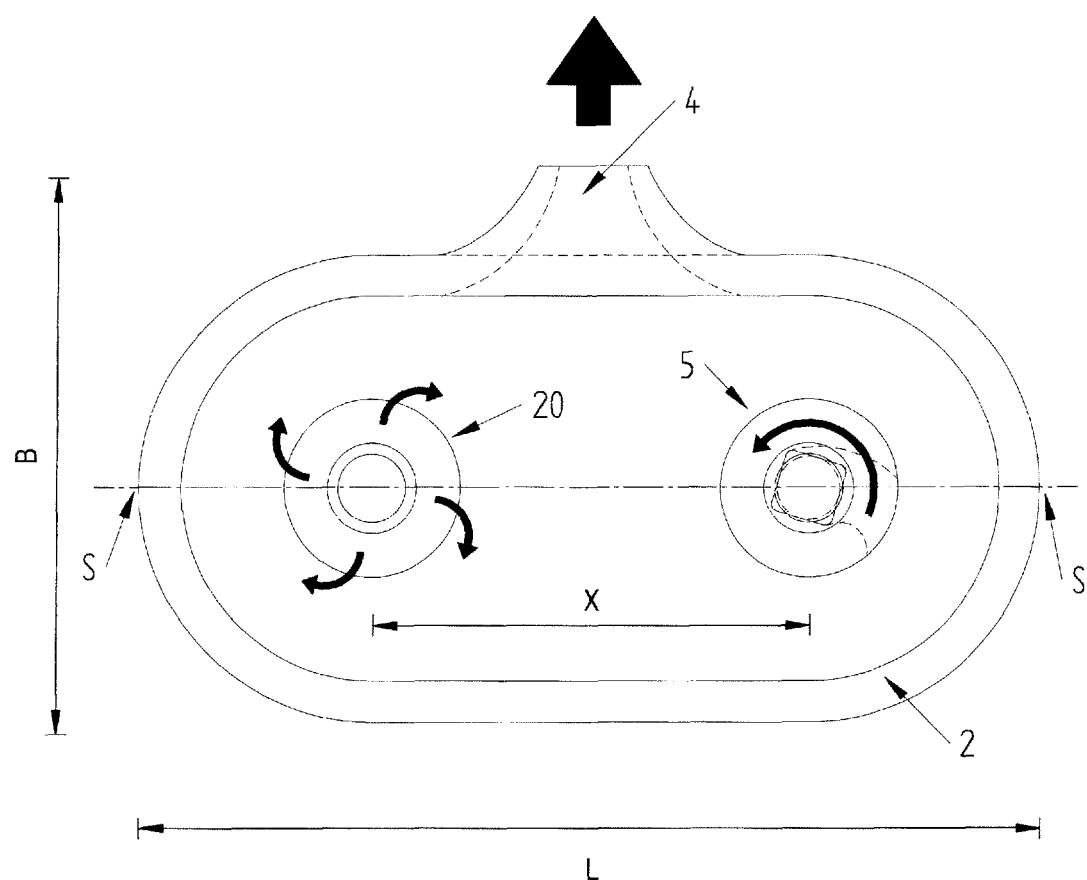
FIG. 6 shows an alternative embodiment of a pump device according to FIG. 2, seen from above.

FIG. 6 shows an alternative embodiment of a fishing pump 1 according to FIG. 2, wherein the fish pump 1 according to this embodiment comprises a pump housing 2 and a removable cover (not shown) which are connected to the pump housing 2 via suitable connecting devices in the form of bolts, screws or the like. The removable cover (not shown) may be of glass to provide an inspection opening in the fish pump. Such a design will also result in an easier access to the inner volume of the pump housing 2, so that maintenance and/or repairs of impellers 5 etc. are facilitated.

Also in this embodiment, the fish pump 1 is designed to have an oval shape, where the pump housing 2 comprises two parallel long sides and two rounded short ends.

In an alternative embodiment, at least one of the long sides of the pump housing 2 may be designed to have a curved shape, whereby the long sides in such an embodiment must not be parallel over their entire length.

In one embodiment, the fish pump 1 has a width B which is less than a length L of the fish pump and is further formed with rounded short sides, thus providing an "oval" shape on the fish pump 1. The fish pump 1 is further formed with a flat top and bottom side when viewed in a longitudinal cross-section of the fish pump 1, where the upper and lower sides are arranged at a distance H from each other.

The pump housing 2, when viewed in a longitudinal cross-section of the fish pump 1, is formed with two spaced apart inlet openings 3, where the inlet openings 3 are further arranged along a longitudinal center line S of the fish pump 1. On an opposite side of the underside, when seen in a longitudinal cross-section of the fish pump 1, the pump housing 2 is formed with two through openings 8, as shown in FIG. 3A.

Each inlet aperture 3 is further formed with a flange 3A or spigot, where the flange 3A or the spigot extends a distance out from the pump housing 2. Each inlet opening 3 is further formed with a first inner cross-sectional area $A^1$ and a second inner cross-sectional area $A^2$, where a transition from it the first inner cross-sectional area $A^1$ to the second inner cross-sectional area $A^2$ will form an abutment shoulder 7 for an impeller 5 and a nozzle 20 arranged in the fish pump 1.

Each of the impeller 5 and the nozzle 20 will be formed with an inlet spigot 5B and a shaft pin 5C. The inlet spigot 5B will be of a shape complementary to the inlet opening 3 of the pump housing 2 and an outer diameter of the inlet spigot 5B is somewhat smaller than the first inner cross-sectional area $A^1$ of the inlet opening 3.

Correspondingly, the shaft pin 5C will be formed with a shape that is complementary to the through openings 8 of the pump housing 2 and an outer diameter which is somewhat smaller than an inner cross-section of the through opening 8.

The impeller 5 and the nozzle 20 are arranged in the same plane and at a distance from each other, the impeller 5 being further formed with a flow channel 6 which provides a rotation of the impeller 5 in one direction, while the nozzle 20 is formed with several flow channels (not shown), for example, four or six, to provide a rotation of the nozzle 20 in an opposite direction to the rotation of the impeller 5.

One skilled in the art will appreciate that nozzle 20 may be formed with fewer or more flow channels than indicated above.

Figure 7:
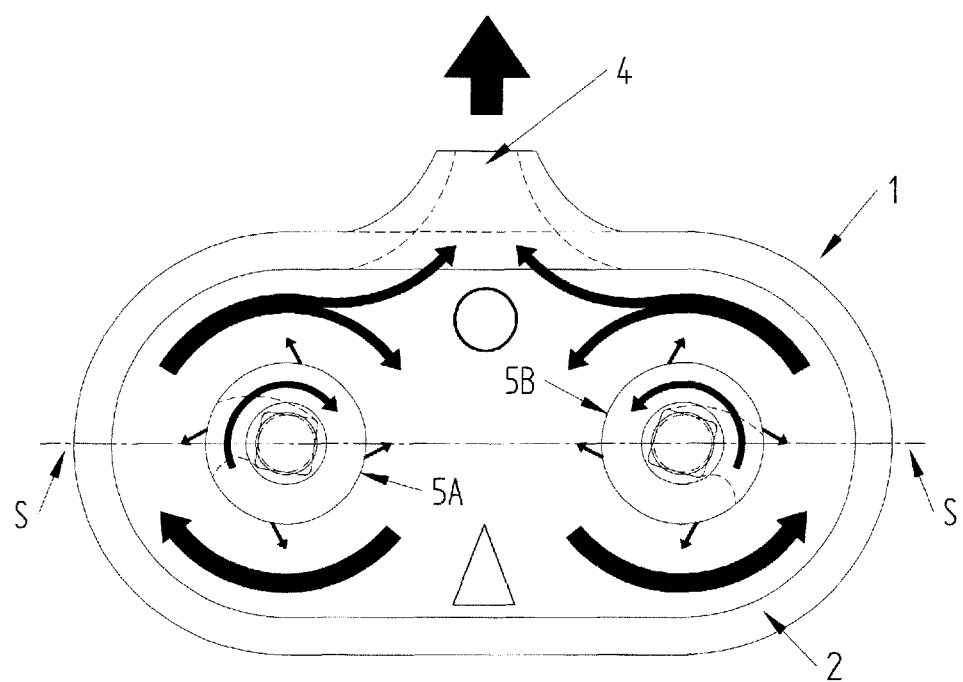
FIG. 7 shows flow conditions in the pump device according to FIG. 2 when the pump device according to the present invention is in use.

Arrows indicate that the impeller 5 will rotate counterclockwise, while the nozzle 20 will rotate clockwise FIG. 7 shows flow conditions in a fish pump 1 according to FIG. 2 during use, where the largest arrows indicate the liquid flows around each impeller 5 and through the fish pump 1. As indicated, the liquid flow formed around one impeller 5 is oppositely directed to the liquid flow formed around the second impeller 5, as the impellers 5 are rotating in opposite directions. The smaller arrows indicate the direction of the liquid flow from each impeller 5.

Areas indicated by circle and triangle indicate areas where there is little movement in the water in the pump housing 2, as the fluid streams from the two impellers 5 meet here and they will counteract each other in these areas.

Figure 8A:
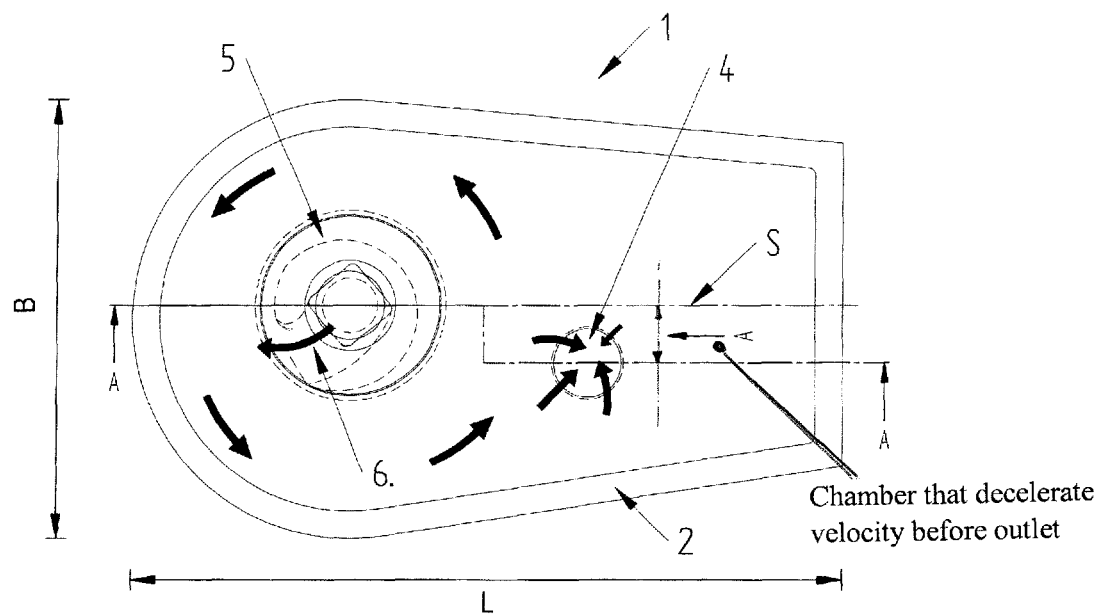
FIGS. 8A-8B show an alternative embodiment of a pump device according to the present invention, seen from above and in a cross-section along the line A-A in FIG. 8A, and FIGS. 9A-9B further illustrate an alternative embodiment of a pump device according to the present invention, seen from above and in a cross-section along the line A-A of FIG. 9A.
Figure 8B:
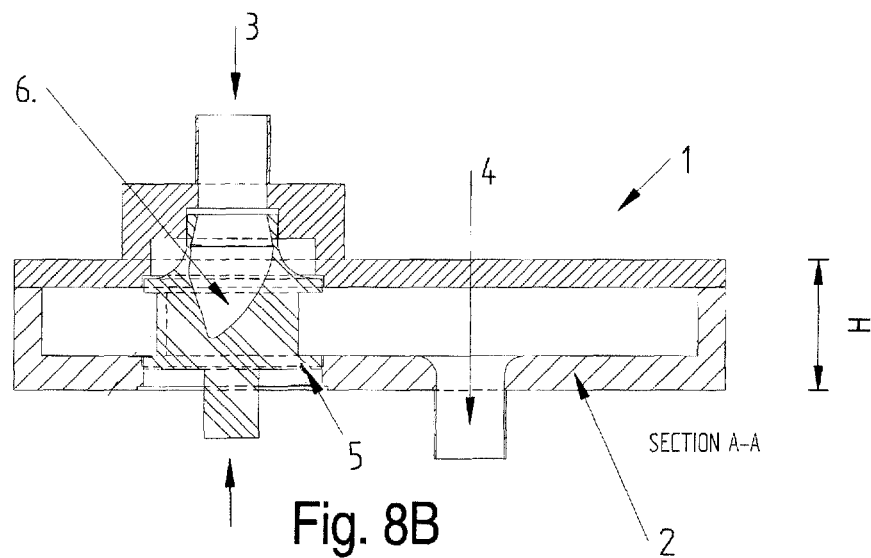

FIGS. 8A-8B show a fish pump 1 according to the present invention, seen from above and in a cross-section along line AA of FIG. 8A, wherein the fish pump 1 comprises a pump housing 2 and a removable cover (not shown) as through suitable connecting means in the form of a bolt, screw or the like is connected to the pump housing 2. The cover (not shown) may be of glass or a transparent material so as to provide an inspection opening in the fish pump 1. A removable cover will also provide a simpler access to the interior of the pump housing 2 so that maintenance, replacement and/or repairs of one or more impellers etc. are facilitated.

A first short side of the pump casing 2 of the fish pump 1 is formed as a semicircle or partial circle, while an opposite and second short side is formed as a flat or plane surface, where the largest width of the first short side is greater than a maximum width of the second short side, whereby the long sides of the pump housing 2 will be tapered from the first short side to the second short side. Furthermore, the largest width of the first short side will be less than a length L of the fish pump 1. As shown in FIG. 8B, the pump housing 2 will further be formed with plane or flat sides when viewed in a longitudinal cross section of the fish pump 1, where the plane or flat sides are arranged at a distance H from each other. The flat or plane sides will, when the fish pump 1 is arranged horizontally, form an upper and lower side of the pump housing 2, or a front and rear side of the pump housing 2 if the fish pump 1 is arranged vertically.

The pump housing 2 is, on one of its flat or plane side, when viewed in a longitudinal cross-section of the pump housing 2, formed with an inlet opening 3, where the inlet opening 3 is further arranged to be laying on a longitudinal center line S. An opposite side of the pump housing 2 is formed with an outlet opening 4, where the outlet opening 4 is arranged to be located at a distance A from the longitudinal center line S and at a distance from the inlet opening 3.

Figure 9A:
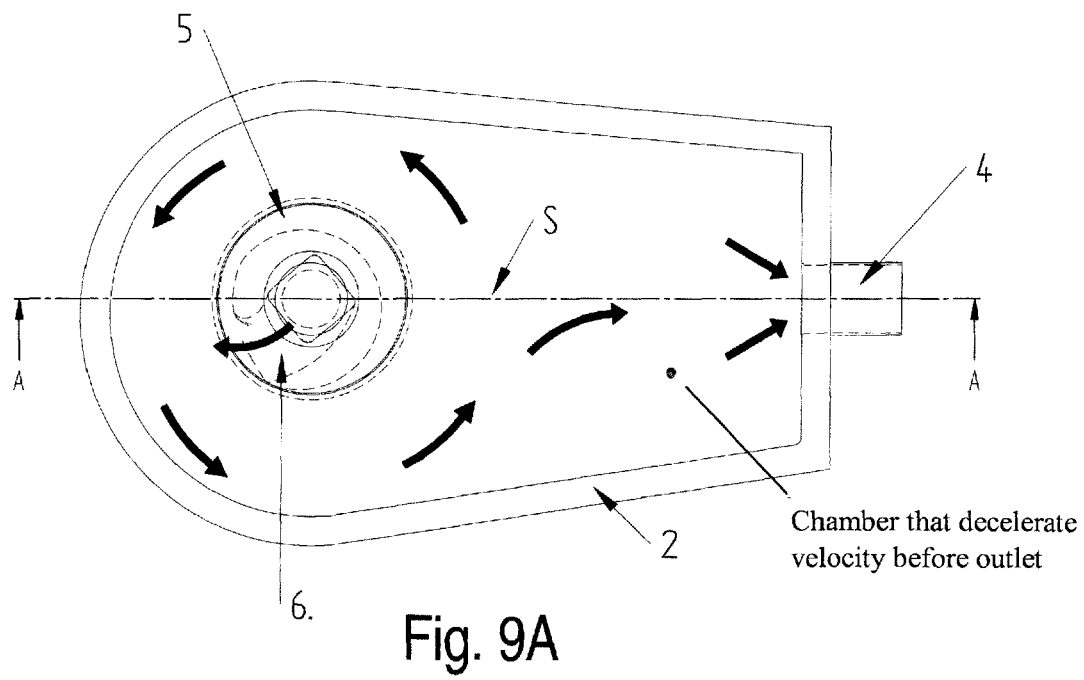

However, one skilled in the art will appreciate that the outlet orifice 4 in this embodiment may also be located on the longitudinal center line S, as shown in FIG. 9A.

The design of the pump housing 2, with the second short side formed as a flat or plane surface and the tapered shape from the first short side to the second short side, will provide, beyond the inlet opening 3 (in an area at the second short side), an area or chamber which will slow down the speed of the water before the outlet opening 4, so that fish is passed through the fish pump 1 in a gentle manner.

An impeller 5 is arranged in the pump housing 2, where the impeller 5 is formed with a flow channel 6 which provides a counterclockwise rotation. The design of the impeller 5 is shown and described in accordance with FIGS. 4 and 5A-5B.

Although the fish pump 1 according to this embodiment is shown with one impeller 5, it is to be understood that the fish pump 1 may comprise several impellers 5 or an impeller 5 and a nozzle 20, such as shown and described in accordance with FIGS. 2, 3A-3B, 6 and 7.

Figure 9B:
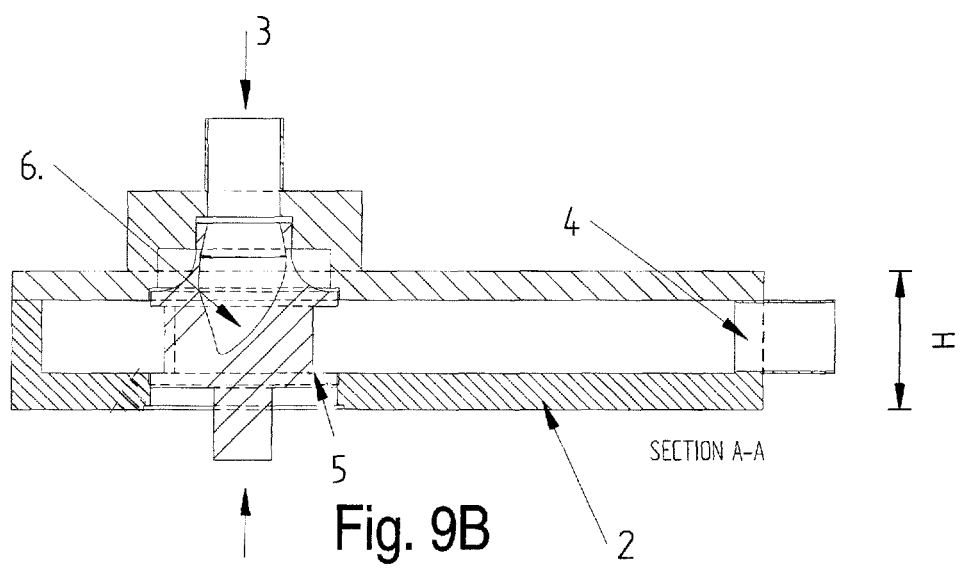

An alternative configuration of a fish pump 1 according to the present invention is shown in FIGS. 9A-9B, seen from above and in a cross-section along line A-A of FIG. 9A. The fish pump 1 comprises a pump housing 2 and a removable cover (not shown) which, through suitable connecting means in the form of bolt, screw or the like, are connected to the pump housing 2. The cover (not shown) may be of glass or a transparent material so as to provide an inspection opening in the fish pump 1. A removable cover will also result in a simpler access to the interior of the pump housing 2, so that maintenance, replacement and/or repairs of one or more impellers etc. are facilitated.

A first short side of the pump casing 2 of the fish pump 1 is formed as a semicircle or a partial circle, while an opposite and second short side is formed as a flat or plane surface, where the largest width of the first short side is greater than a maximum width of the second short side, whereby the long sides of the pump housing 2 will be tapered from the first short side to the second short side. Furthermore, the largest width of the first short side will be less than a length L of the fish pump 1. As shown in FIG. 9B, the pump housing 2 will further be formed with two plane or flat sides when viewed in a longitudinal cross section of the fish pump 1, where the flat or plane sides are arranged at a distance H from each other. The flat or plane sides, when the fish pump 1 is arranged horizontally, will form an upper and lower side of the pump housing 2, or a front and rear side of the pump housing 2 if the fish pump 1 is arranged vertically.

The pump housing 2 is on one of its one flat or plane sides, when viewed in a longitudinal cross-section of the pump housing 2, formed with an inlet opening 3, where the inlet opening 3 further is arranged to be located on a longitudinal center line S. The other short side of the pump housing 2, which is formed with the plane or flat surface, is formed with an outlet opening 4, where the outlet opening 4 is also arranged to be located on the longitudinal center line S.

However, one skilled in the art will appreciate that the outlet opening 4 in this embodiment may also be located at a distance A from the longitudinal center line S, as shown in FIG. 8A.

The design of the pump housing 2, with the second short side formed as a flat or plane surface and the tapered shape from the first short side to the second short side, will beyond the inlet opening 3 (in an area at the second short side), provide an area which will slow the speed of the water before the outlet opening 4, so that fish is passed through the fish pump 1 in a gentle manner 1.

An impeller 5 is arranged in the pump housing 2, where the impeller 5 is formed with a flow channel 6 which provides a counterclockwise rotation. The design of the impeller 5 is shown and described in accordance with FIGS. 4 and 5A-5B.

Although the fish pump 1 according to this embodiment is shown with one impeller 5, it is to be understood that the fish pump 1 may comprise several impellers 5 or an impeller 5 and a nozzle 20, such as shown and described in accordance with FIGS. 2, 3A-3B, 6 and 7.

The invention has now been explained with several non-limiting exemplary embodiments. One skilled in the art will appreciate that a variety of variations and modifications can be made to the fish pump for loading and unloading fish as described within the scope of the invention as defined in the appended claims.

The invention claimed is:

1. A pump device for sucking and transferring of objects, the pump device comprising:
   a pump housing;
   at least one impeller;
   an air withdrawal opening;
   at least one inlet opening defined in the pump housing;
   at least one outlet opening defined in the pump housing; and
   at least one drive device,
   wherein:
   the pump housing includes a first short side defined as a semicircle or partial circle and a second short side defined as a flat or plane surface, two long sides having a tapered shape extending from the first short side to the second short side, and two planar sides so as to define a closed pump housing;
   the at least one impeller is in the pump housing;
   a flow channel is defined in the at least one impeller so as to fluidly connect an interior of the pump housing with the at least one inlet opening of the pump housing;
   an outlet of the flow channel is substantially perpendicular to an inlet of the flow channel;
   the at least one outlet opening of the pump housing is substantially parallel to the at least one inlet opening of the pump housing;
   the at least one inlet opening of the pump housing is closer to the first short side of the pump housing, and the at least one outlet opening of the pump housing is closer to the second short side of the pump housing;
   the tapered shape, extending from the first short side of the pump housing to the second short side of the housing, defines an area or chamber configured to slow down a speed of water before the at least one outlet opening of the pump housing; and
   the area or chamber is beyond the at least one inlet opening of the pump housing in a location at the second short side of the pump housing.

2. The pump device according to claim 1, wherein a width of the pump housing is less than a length of the pump housing.

3. The pump device according to claim 1, wherein:
   the at least one inlet opening has a first cross-sectional area and a second cross-sectional area; and
   a transition between the first cross-sectional area and the second cross-sectional area defines an abutment shoulder.

4. The pump device according to claim 1, wherein:
   the at least one impeller includes a main part, an inlet spigot on a first side of the main part, and a shaft pin on a second side of the main part which is opposite to the inlet spigot;
   the flow channel extends through the inlet spigot and the main part; and
   the inlet spigot defines the inlet of the flow channel and the main part defines the outlet of the flow channel.

5. The pump device according to claim 4, wherein the at least one impeller has a smooth surface outer around a circumference thereof, the smooth outer surface extending from a first side of the outlet of the flow channel, around an entirety of the circumference of the at least one impeller, to a second side of the outlet of the flow channel which is opposite to the first side of the outlet of the flow channel.

6. The pump device according to claim 4, wherein the flow channel has a substantially equal cross section over an entire length of the flow channel.

7. The pump device according to claim 4, wherein the flow channel has a helical or curved shape from the inlet of the flow channel to the outlet of the flow channel.

8. The pump device according to claim 4, wherein a length of the flow channel extends less than a half of a circumference of the at least one impeller.

9. The pump device according to claim 4, wherein a length of the flow channel extends less than a third of a circumference of the at least one impeller.

10. The pump device according to claim 4, wherein a length of the flow channel extends less than a quarter of a circumference of the at least one impeller.

* * * * *